July 3, 1951  F. C. GORDON  2,558,840

STARTING GEAR FOR INTERNAL-COMBUSTION ENGINES

Filed March 28, 1949  2 Sheets-Sheet 2

INVENTOR
F. C. GORDON by Wilkinson Mawhinney
Attorneys

Patented July 3, 1951

2,558,840

UNITED STATES PATENT OFFICE 2,558,840

STARTING GEAR FOR INTERNAL-COMBUSTION ENGINES

Francis Charles Gordon, Littleover, Derby, England, assignor to Rolls-Royce Limited, Derby, England, a British company Application March 28, 1949, Serial No. 83,912
In Great Britain April 6, 1948

8 Claims. (Cl. 123—179)

This invention relates to starting gear for internal combustion engines of the kind comprising a turbine which can be connected to drive the engine through a dog clutch, and a speed-reducing gear located between the turbine and the dog clutch.

Such starting gear is generally arranged so that the dog clutch is engaged, either automatically when the turbine starts to rotate or by a separate engaging control, and torque is then transmitted through it from the turbine to the engine. When the engine starts firing the dog clutch is automatically disengaged so that the engine does not drive the turbine.

An object of the present invention is to reduce the free travel of the turbine rotor during engagement of the dog clutch when such engagement is effected whilst the turbine is rotating. The greater the free travel of the turbine rotor the greater the speed it attains before it starts to transmit torque to the engine, and hence the greater the impact in the starter drive when transmission of the torque to the engine commences.

According to the present invention, starting gear for an internal combustion engine comprises a turbine, an epicyclic speed-reducing gear having its input drivingly connected with the turbine and having two speed-reducing stages, a dog clutch member arranged to be driven from the epicyclic speed-reducing gear and capable of engagement during rotation of the turbine with a co-operating dog clutch member on a shaft of the engine, locking means arranged when operative to lock the epicyclic speed-reducing gear as a solid drive, means responsive to an operating condition in the starting gear and operative when said condition attains a selected value to render said locking means inoperative, and means to produce a reaction torque for the epicyclic speed-reducing gear when said locking means is inoperative.

The means responsive to an operating condition of the starting gear may be arranged to be responsive to the turbine rotational speed and to render the locking means inoperative when the turbine rotational speed reaches a selected value. With such an arrangement the locking means may comprise a centrifugal clutch arranged when the turbine speed is below the selected value, to lock together two relatively movable parts of the speed-reducing gear and arranged when the turbine speed attains said selected value to be disengaged to permit relative movement of said parts.

Alternatively the means responsive to an operating condition of the starting gear may be arranged to be responsive to the torque transmitted through the gear and to render the locking means inoperative when a selected value of said torque is attained. In such an arrangement the locking means may comprise a friction clutch whereof one friction clutch member is connected with one part of the epicyclic speed-reducing gear and whereof the co-operating friction clutch member is connected with a second part of the epicyclic speed-reducing gear which is capable of movement relative to the first part, said friction clutch members being disengageable when the torque through the speed-reducing gear attains a selected value.

The means to provide a reaction torque for the epicyclic speed-reducing gear may comprise a free-wheel clutch arranged so as to permit rotation of one element of the epicyclic speed-reducing gear when said gear is locked as a solid drive and to prevent rotation of said element in the opposite direction thereby to provide a reaction torque when the epicyclic speed-reducing gear is not locked as a solid drive.

One construction of starting gear according to this invention will now be described with reference to the accompanying drawings in which.

Figure 1:
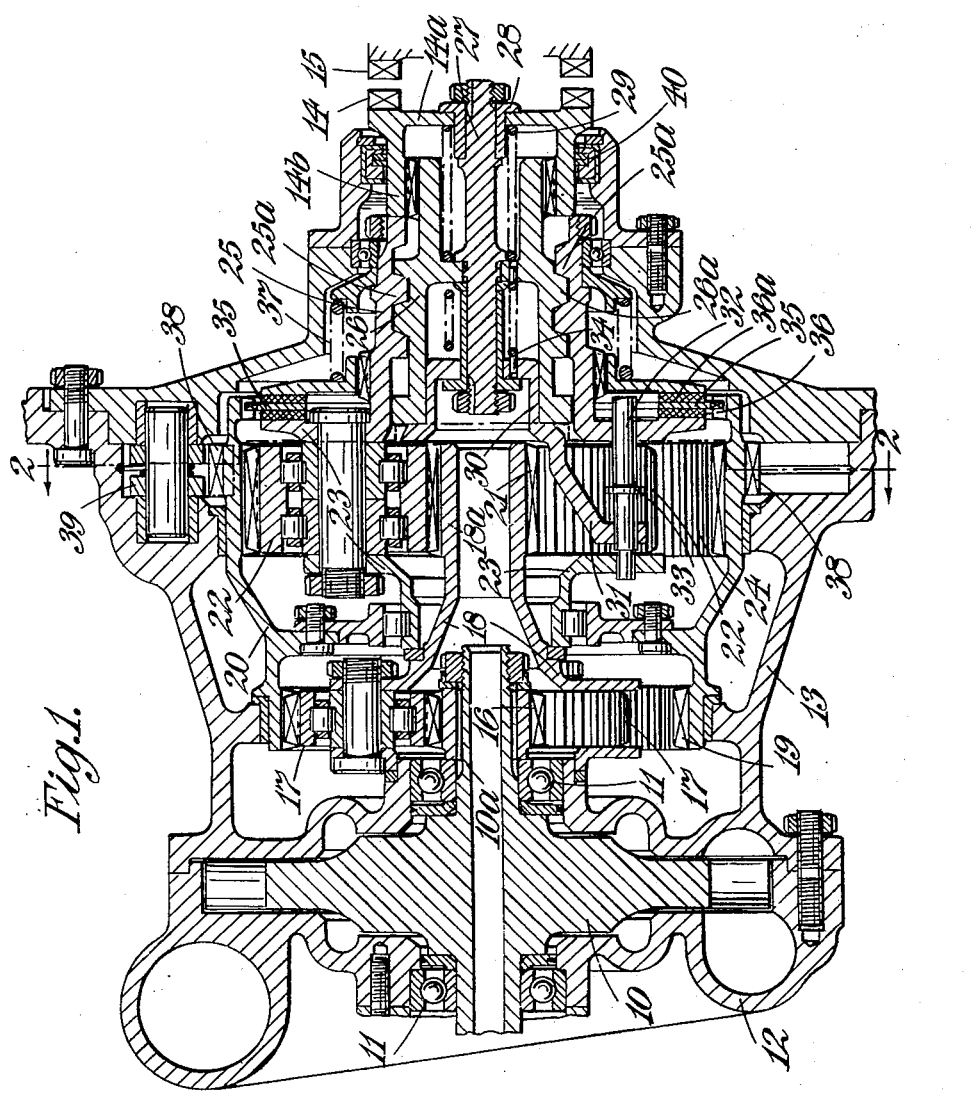
Figure 1 is an axial section through the starting gear.
Figure 2:
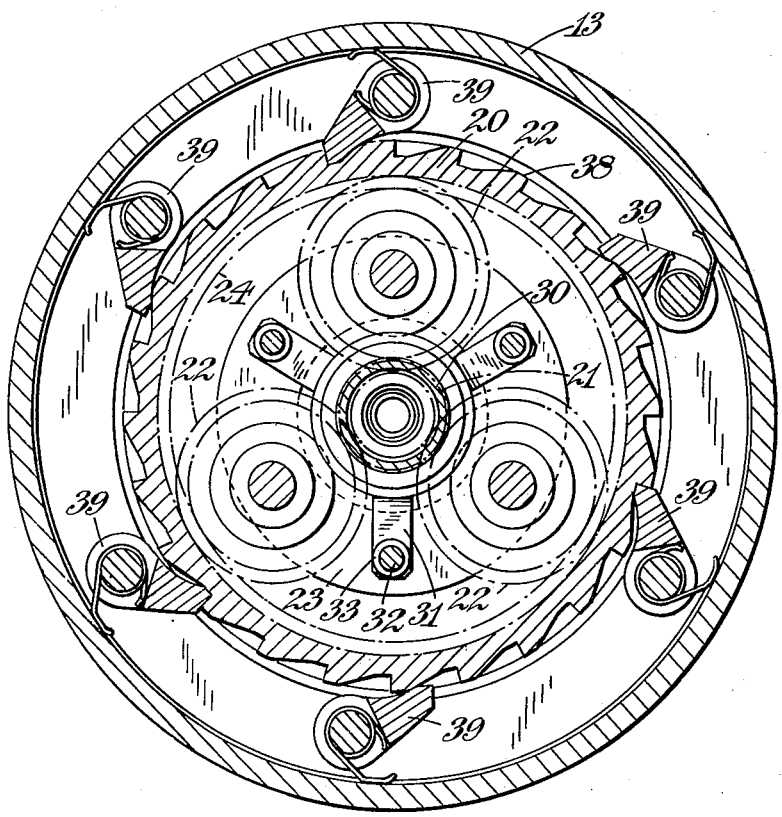
Figure 2 is a section on the line 2—2 of Figure 1.

Referring to the drawings, the starting gear comprises a turbine the rotor 10 of which is mounted in bearings 11 in a turbine casing 12, the turbine being arranged to be supplied with a motive fluid in any known or convenient manner. The turbine casing 12 is connected with a gear casing 13 housing an epicyclic speed-reducing gear, the output from which is through a dog clutch member 14 which is capable of engagement with a co-operating dog clutch member 15 on a shaft forming part of an internal combustion engine with which the starting gear is associated.

The shaft 10a of the turbine has secured on it a sun gear 16 which meshes with a set of, say, three planet gears 17 supported in a planet carrier 18. The set of planet gears 17 also mesh with internal teeth 19 on an annular gear member 20. The planet carrier 18 is formed with an axial sleeve-like extension 18a provided with gear teeth 21 to form a second sun gear. The second sun gear meshes with a second set of, say, three planet gears 22 supported in a planet carrier 23. The second set of planet gears 22 also mesh with a series of internal teeth 24 formed on the annular gear 20 to be coaxial with but axially spaced from the set of internal teeth 19.

The planet carrier 23 is formed with an axial sleeve-like extension 25 which is provided internally with a coarse thread 25a. A second sleeve 26 formed with an external thread 26a is engaged with the extension 25 internally thereof. A double bolt member 27 is secured to an internal web on the sleeve 26, one portion of the bolt member extending outwardly beyond the outer end of the sleeve 26 and carrying an abutment 28 for a flange 14a on the dog clutch member 14 which has an axial extension 14b splined to the outer end of the sleeve 26. A compression spring 29 is provided between the flange 14a and the internal web on the sleeve 26 to urge the flange 14a against the abutment 28. The other end of the bolt member 27 extends in the opposite direction and carries a spider member 30 the boss of which is engaged within the inner end of the sleeve 26. The spider has three arms 31 extending from its boss 30 to engage with push-rods 32, slidingly mounted in the planet carrier 23. The push-rods 32 are formed with shoulders 33, so that when the spider arms 31 come into contact with them the push-rods 32 are constrained to slide in the planet carrier 23 to disengage a friction clutch in a manner hereinafter to be described. The boss of the spider 30 is connected with the internal wall on the sleeve 26 through a torsion spring 34. It will be seen that although the spider member moves axially with the sleeve 26 it is prevented from rotating with respect to the sleeve 25 by the engagement of the spider arms 31 with the push-rods 32.

The planet carrier 23 and the annular gear 20 are arranged to be connected by a friction clutch. The friction clutch comprises a plate 35 having splined engagement with the annular gear 20 and forming one friction member of the friction clutch and also comprises co-operating friction members 36, 36a one of which (36) is secured to the planet carrier 23 and the other (36a) of which is mounted on a disc having a splined engagement with the planet carrier 23. The friction clutch parts 35, 36, 36a are urged into engagement with one another by a compression spring 37. Disengagement of the clutch is effected by sliding movement of the push-rods 32 which engage by their ends with the member 36a to displace it axially of the planet carrier 23 against the action of the spring 37.

The annular gear 20 is formed externally with a series of ratchet teeth 38 which ratchet teeth are engaged by spring-loaded pawls 39 mounted in the gear casing 13. It will be seen that the ratchet teeth 38 and the spring-loaded pawls 39 form a free-wheel clutch which permits the annular gear 20 to rotate in one direction and prevents it rotating in the opposite direction. In this construction the pawls 39 are so arranged with respect to the ratchet teeth 38 as to give a small back lash.

The operation of the starting gear is as follows:

With the turbine stationary the parts occupy the positions illustrated in Figure 1, the clutch 35, 36, 36a being engaged and the planet carrier 23 thus locked to the annular gear 20, so that the epicyclic gear is in effect a solid drive. Therefore when the turbine starts to rotate the sleeve 25 will rotate at the same speed as the turbine. On commencement of rotation of the turbine 10 the sleeve 26 is caused to move axially by the threaded engagement between it and the sleeve 25 due to a combination of the frictional drag in the oil seal 40 between the dog clutch member and the casing and the inertia of the dog clutch member 14 and of the inner sleeve. This movement of the sleeve carries the dog clutch member 14 towards and into engagement with the dog clutch member 15 and at the same time carries with it the spider member 30, 31, and the arms 31 of which therefore travel along the push-rods 32. When the dogs on the clutch member 14 engage with the dogs on the dog clutch member 15 on the engine shaft, an increased restraining drag is applied to the dog clutch member 14 and to the inner sleeve 26, due to the inertia of the engine. This restraining drag causes further axial movement of the inner sleeve 26 with respect to the outer sleeve 25 and thus of the dog clutch member by reason of the threaded engagement of the inner and outer sleeves. This further axial movement causes the spider arms 31 to engage behind the shoulders 33 on the pins 32. The total axial travel of the dog clutch member 14 is equal to the travel of the spider member 30, 31 from its initial position to the position in which the spider arms 31 engage behind the shoulders 33, and is less than the total axial travel of the sleeve 26. When the dog clutch member 14 has reached the limit of its travel and is in full engagement with the dog clutch member 15, further axial movement of the sleeve 26 causes the spring 29 to be compressed, and displaces the pins 32 axially to move the friction clutch member 36a out of engagement, against the spring 37. The preselected value of the torque transmitted through the starting gear at which disengagement of the friction clutch 35, 36, 36a occurs is therefore determined by the strength of the spring 37. Since the spider member 30, 31, cannot rotate with respect to the sleeve 25 the rotational movement of the sleeve 26 with respect to the sleeve 25 causes the gradual winding up of the spring 34.

On disengagement of the friction clutch the epicyclic gear will be free to act as a speed-reducing gear; the annular gear 20 will initially rotate in the reverse direction to the rotation of the turbine by an amount sufficient to take up the back lash in the pawl and ratchet mechanism and is then prevented from rotating in said reverse direction by engagement of the pawls 39 with the ratchet teeth 38. The annular gear 20 thus becomes a torque reaction member for the epicyclic gear.

If, for example, the speed-reduction ratio of the epicyclic gear is 30:1, it will be appreciated that the turbine rotor 10 does not have an angular travel 30 times the angular travel of the inner sleeve 26 which carries the dog clutch member 14 whilst the dog clutch is being engaged with the dog clutch member 15 but only an equal travel. After the dog clutch 15 is engaged the torque transmitted from the turbine rotor 10 to the engine causes further axial movement of the inner sleeve 26. On attainment of a selected value of the torque, dependent on the strength of the compression spring 37, this further movement disengages the friction clutch and the epicyclic gear operates as a speed-reducing gear so that the turbine runs 30 times as fast as the engine.

With this arrangement therefore the turbine 10 is prevented from attaining an excessive speed, so that the impact in the starter drive is not so great as would be the case were the turbine 10 permitted to rotate at 30 times the speed of the inner sleeve 26 during engagement of the dog clutch 14, 15.

When the supply of motive fluid to the turbine diminishes so that the driving torque transmitted through the dog clutch 14, 15 falls below the selected value, the load of the spring 29 acting on the sleeve 26 and the load of the spring 37 acting on the friction clutch member 36a cause the sleeve 26 to be displaced in a direction towards the turbine 10 and re-engage the friction clutch 35, 36, 36a. The turbine rotor is forced to slow down and some of its kinetic energy will be imparted to the engine. In known arrangements of starting gear this kinetic energy has not been used.

When the engine accelerates the dog clutch member 15 overruns the dog clutch member 14 and causes the latter to move axially out of engagement. The torsion spring 34 tends to unwind and assists in causing the dog clutch member 14 to move out of engagement; during running of the engine the torsion spring 34 functions to retain the inner sleeve 26 in the retracted position, thereby retaining the dog clutch member 14 in the retracted position through the bolt member 27 and the abutment 28 to avoid wear on the teeth of the dog clutch member 14 and 15.

The invention is not limited to the particular construction above described. For instance, instead of a pawl and ratchet free-wheel clutch between the annular gear 20 and the casing 13 any other suitable form of free-wheel clutch may be employed, such for example as a free-wheel clutch of the wedging roller type.

I claim:

1. A starting device for an internal combustion engine comprising a casing, and within the casing a turbine rotor, a first sun gear mounted to rotate with the turbine-rotor, first planet gears meshing with said first sun gear, a first planet carrier for said first planet gears, an annular gear member having a first internal annular gear meshing with said first planet gears and a second internal annular gear, a second sun gear mounted to rotate with the first planet carrier, second planet gears meshing with the second sun gear and the second internal annular gear, a second planet carrier for the second planet gears, a free-wheel device between the annular gear member and the casing to permit rotation of the annular gear member in the direction of rotation of the second sun gear but to prevent rotation of the annular gear member in the opposite direction, a friction clutch whereof one clutch element rotates with the second planet carrier and a co-operating clutch element rotates with the annular gear member, spring means to urge said friction clutch elements into engagement, a member carrying a dog clutch element for engagement with a shaft of the engine, said member having a threaded engagement with the second planet carrier so as to be capable of axial and rotational displacement with respect to the second planet carrier, a friction-clutch-disengaging member carried by said dog-clutch-carrying member to move axially therewith and connected with the second planet carrier to be restrained against rotation with respect to the second planet carrier; the arrangement being such that as the turbine-rotor starts to rotate, the sun gears, planet gears, planet carriers and annular gear member rotate as one, the friction clutch being in engagement, and the dog-clutch-carrying member moves axially and rotationally with respect to the planet carriers to engage the dog clutch element with the engine shaft and carries with it the friction-clutch-disengaging member, and that, when the torque transmitted through the starting gears reaches a preselected value, the friction-clutch-disengaging member effects disengagement of the friction device allowing the sun gear, planet gears, and planet carriers to act as an epicyclic speed-reducing gear with two speed reducing stages and the annular gear member to act as a torque reaction member for the epicyclic gear, the free-wheel device preventing rotation of the annular gear member in a direction opposite to the direction of rotation of the sun gears.

2. A starting device as claimed in claim 1, wherein said friction-clutch disengaging member comprises a spider member having arms, which spider member is carried by the dog-clutch carrying member to move axially therewith and to be free rotationally thereon; the starting device further comprising push rods slidable axially in the second planet carrier to disengage the friction clutch, which push rods engage with the arms of the spider member and are slid axially thereby to disengage the friction clutch when the dog-clutch carrying member moves axially with increase of torque transmitted through the starting device to the preselected value.

3. In a starting device of the class comprising a turbine, a dog clutch member and means including an epicyclic speed-reducing gear comprising at least two speed-reducing stages, each stage including a sun gear, a planet gear, and an internally-toothed annular gear, which means drivingly interconnects the turbine and the dog clutch member, the combination with the epicyclic speed-reducing gear of locking means to lock the epicyclic speed-reducing gear as a solid drive when said locking means is in the operative position, means comprising an axially movable element responsive to an operating condition in the starting device and operative when said condition attains a selected value to shift the locking means from an operative position to an inoperative position, and means to provide a reaction torque for the epicyclic speed-reducing gear when said locking means is in an operative position.

4. In a starting device of the class comprising a turbine, a dog clutch member and means including an epicyclic speed-reducing gear comprising at least two speed-reducing stages, each stage including a sun gear, a planet gear, and an internally-toothed annular gear, which means drivingly interconnects the turbine and the dog clutch member, the combination with the epicyclic speed-reducing gear of locking means to lock the epicyclic speed-reducing gear as a solid drive when said locking means is in the operative position, means comprising an axially movable element responsive to the torque transmitted through the starting device and operative when a selected value of the torque is attained to shift the locking means from an operative position to an inoperative position, and means to provide a reaction torque for the epicyclic speed-reducing gear when said locking means is in an inoperative position.

5. A combination as claimed in claim 4, wherein said locking means comprises a friction clutch whereof one friction clutch member is connected with one part of the epicyclic speed-reducing gear and whereof a co-operating friction clutch member is connected with a second part of the epicyclic speed-reducing gear which is capable of movement relative to said one part, and wherein the means responsive to the torque transmitted through the starting device is operative to disengage said friction clutch members when a selected value of the torque is attained.

6. A combination as claimed in claim 4 wherein the means responsive to the torque transmitted through the starting device comprises a pair of members arranged to be displaced relatively on change of the torque transmitted, and by said relative displacement to cause disengagement of the friction clutch members when a selected value of the torque is attained.

7. A combination as claimed in claim 4 comprising a casing for the speed-reducing gear and wherein the means to provide a reaction torque for the epicyclic speed-reducing gear when the locking means is in an inoperative position comprises a free-wheel device between an element of the speed-reducing gear and the casing for the speed-reducing gear.

8. A combination as claimed in claim 4 comprising a casing for the speed-reducing gear and wherein the planet gears of said speed-reducing stages of said epicyclic speed-reducing gear mesh with a common annular gear member and wherein the means to provide a reaction torque for the epicyclic speed-reducing gear when the locking means is in an inoperative position comprises a free-wheel device between said common annular gear member and the casing for the speed-reducing gear.

FRANCIS CHARLES GORDON.

REFERENCES CITED

The following references are of record in the file of this patent:

UNITED STATES PATENTS

| Number | Name | Date |
|---|---|---|
| 1,256,596 | Rogers | Feb. 19, 1918 |
| 1,279,659 | Cotterman | Sept. 24, 1918 |
| 1,526,719 | Saives | Feb. 17, 1925 |
| 1,951,388 | Anderson | Mar. 20, 1934 |
| 2,140,083 | Lansing | Dec. 13, 1938 |
| 2,154,572 | Lansing | Apr. 18, 1939 |
| 2,458,070 | Gilbert | Jan. 4, 1949 |
| 2,506,663 | DeGuerin | May 9, 1950 |